United States Patent [19]
Sugahara

[11] 3,729,790
[45] May 1, 1973

[54] ONE-PIECE CHANNEL SHAPED PISTON RING

[75] Inventor: Eisuke Sugahara, Tokyo, Japan

[73] Assignee: Nippon Piston Ring Co., Ltd., Tokyo-to, Japan

[22] Filed: Oct. 29, 1970

[21] Appl. No.: 85,042

[30] Foreign Application Priority Data

Oct. 30, 1969 Japan ................................44/86454

[52] U.S. Cl..............................29/156.63, 277/201
[51] Int. Cl. ..........................................B23p 15/06
[58] Field of Search......................29/156.6, 156.01, 29/156.62, 156.63; 277/201

[56] References Cited

UNITED STATES PATENTS

| 1,618,665 | 2/1927 | Lloyd | 29/156.63 |
| 1,849,467 | 3/1932 | Okochi et al. | 29/156.63 |
| 2,696,038 | 12/1954 | Hunt | 29/156.63 |

*Primary Examiner*—Robert I. Smith
*Attorney*—Sughrue, Rothwell, Mion, Zinn & Macpeak

[57] ABSTRACT

A piston ring has an electrolytic Cr plating applied to the surface of the channel shaped steel article prior to slitting by the grinder to form a plurality of lateral slits.

3 Claims, 12 Drawing Figures

PRIOR ART

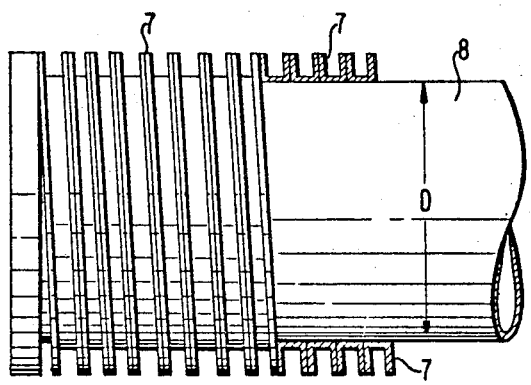
FIG. 6
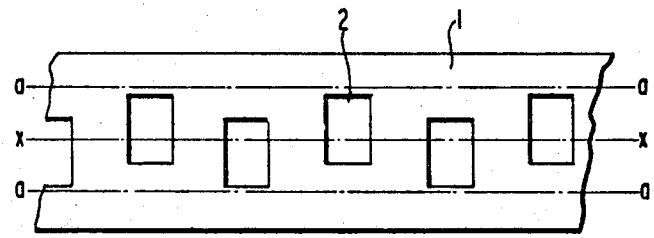
FIG. 8
FIG. 10
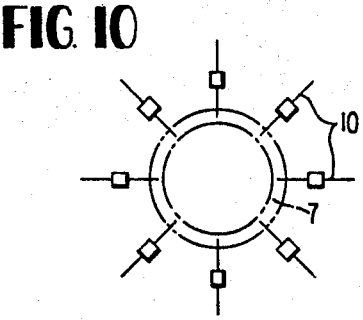
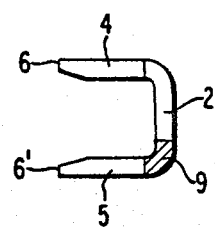
FIG. 9
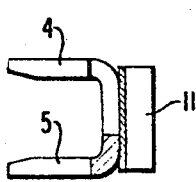
FIG. 11
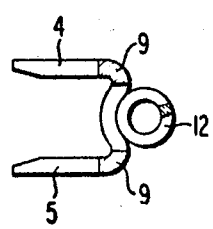
FIG. 12

ONE-PIECE CHANNEL SHAPED PISTON RING

BACKGROUND OF THE INVENTION

1. Field of the Invention

This invention relates to a method of producing a one-piece channel shaped piston oil ring for an internal combustion engine.

2. Description of the Prior Art

The one-piece channel shaped piston ring commonly known as a U-Flex ring found in U. S. Pat. No. 2,932,543 and U. S. Pat. No. Re, 24,930, is produced by bending a channel shaped soft steel article having a plurality of lateral slits into a ring, so that the slits emerge on a pair of sliding faces of the ring. These slits often cause an end effect while subjected to the electrolyzing treatment, the electrolytic Cr plating being scarcely applied to the sliding faces. Therefore, hard and durable sliding faces have not been obtained for such channel shaped piston ring.

SUMMARY OF THE INVENTION

This invention provides a novel method of electrolytic Cr plating the sliding faces of one-piece channel shaped piston rings capable of imparting favorable wear resistance and durability to the sliding faces thereof.

BRIEF DESCRIPTION OF THE DRAWINGS

An example of this invention will be explained with reference to accompanied drawings, wherein:

FIG. 6 is a partly cross sectioned side view of a drum on which the channel shaped steel tape is wound spirally to have the diameter equal to that of the final piston ring.

FIG. 8 is a plan view of another steel tape to be formed into the channel shaped piston ring, having a plurality of laterally offset oil windows.

FIG. 9 is a lateral cross section of the final channel shaped piston ring produced by bending the steel tape of FIG. 8 into channel shape and further into a ring.

FIG. 10 is a schematic view of a grinder assembly having a plurality of heads to be applied to the channel shaped steel tape to form a plurality of the slits simultaneously.

FIG. 11 is a lateral cross section of the channel shaped piston ring combined with a corrugated expander, and FIG. 12 is a lateral cross section of a channel shaped piston ring combined with a coil expander.

DESCRIPTION OF THE PREFERRED EMBODIMENT

Figure 1:
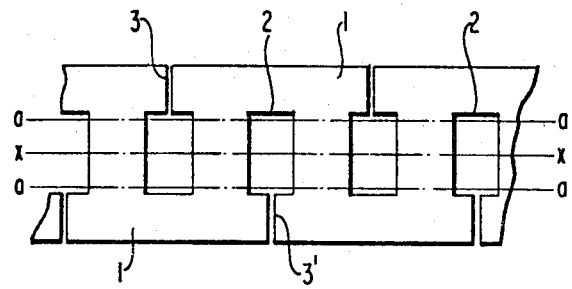
FIG. 1 is a plan view of a steel tape to be formed into the conventional channel shaped piston ring, having a plurality of oil windows and lateral slits.
Figure 2:
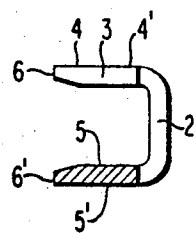
FIG. 2 is a lateral cross section of the conventional channel shaped piston ring of FIG. 1 along the slit.
Figure 3:
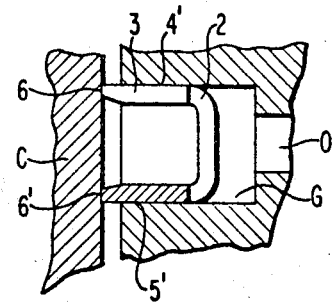
FIG. 3 shows a cross section of an assembly composed of a piston, a cylinder and the channel shaped piston ring of FIG. 1 inserted therebetween.

Referring to FIGS. 1 – 3, the conventional channel shaped piston ring and the method of producing the latter will be first described. The steel sheet tape 1 having a plurality of rectangular oil windows 2 at regular intervals and lateral slits 3, 3' arranged alternately at respective sides of the tape, is bent longitudinally along line a—a to form a channel composed of a pair of sidewalls 4 and 5 and a bottom face including the oil windows 2. End faces 6 and 6' of both said side walls serve as the sliding faces. This channel shaped article is cut into the desired length and bent into a ring. The thus obtained piston ring is inserted into an oil ring groove G of a piston so that the upper face 4' and the lower face 5' touch the groove walls, and the sliding faces 6 and 6' are brought into contact with a wall of a cylinder C which engages the piston. Thus, the excess oil stuck to the cylinder wall is scraped by the oil ring and drained through the oil windows 2 and oil ducts O in the piston to an oil pan (not shown), FIG. 3.

On the other hand, a channel shaped piston ring according to this invention will be described referring to FIGS. 4 – 12. This channel shaped piston ring has the sliding faces plated with a hard and wear resistant Cr layer, which is not applied to the conventional piston ring, as shown in FIGS. 1 – 3.

Figure 4:
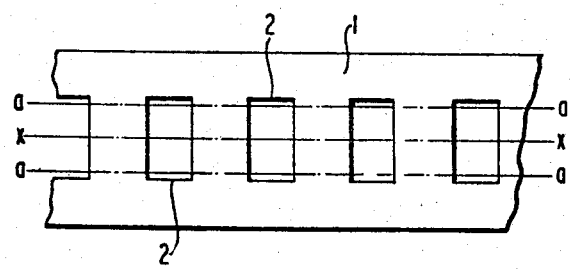
FIG. 4 shows a plan view of a steel tape to be formed into a channel shaped piston ring according to this invention, having a plurality of oil windows.
Figure 5:
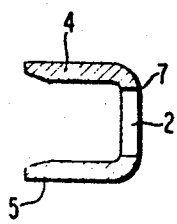
FIG. 5 is a lateral cross section of the channel shaped steel sheet after bending.
Figure 7:
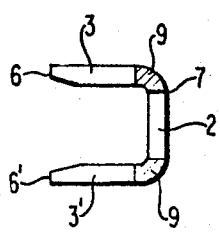
FIG. 7 is a lateral cross section of the final channel shaped piston ring along a slit.

A thin steel sheet tape 1 having a plurality of rectangular oil windows 2 arranged at regular intervals along a longitudinal centerline X as shown in FIG. 4 is bent along a pair of longitudinal lines a—a and a—a to form a channel shaped article 7 having sidewalls 4 and 5, as shown in FIG. 5. Then the steel articles 7 are wound spirally on a drum 8 having the outer diameter equal to the groove diameter D of the piston ring, as shown in FIG. 6, and the outer surface of the wound articles is electrolytic Cr plated. After that, a plurality of slits 3, 3' of predetermined depth are cut into both sidewalls 4, 5 in line with the oil windows but leaving a connecting part 9, as shown in FIG. 9. Finally, the channel shaped article 7 is cut into the desired length and formed into the ring shape.

In the aforesaid Cr plating step, since the channel shaped article 7 wound on the drum 8 has no slits on the widewalls 4, 5, during plating the "end effect" cannot occur and a favorable Cr-plated layer is achieved.

In the aforesaid slit cutting step, since the same figured and sized oil windows are arranged along the centerline X—X of the steel sheet tape 1, the slits 3 and 3' are easily and simultaneously cut in respective sidewalls 4 and 5 by a grinder to have the equal depths and to leave the connecting parts 9.

In another example using a steel sheet tape 1 of FIG. 8 having oil windows 2 standing on different levels in every other window, if equal depth of the slits are cut simultaneously in both sidewalls 4, 5 by the grinder, one of the slits reaches the oil window 2 but the other does not reach to the latter and a connecting part 9 remains, a shown in the FIG. 9. The connecting parts 9 are formed alternately at every other window so as not to sever the channel shaped piston ring, and both slits can be formed in one step.

The cutting of the slits can be achieved by using one grinder head 10 several times in a plurality of cutting steps, but it is more advantageous to apply a multiple head grinder assembly on the wound article for multiple groove slitting in one step, as shown in FIG. 10.

The step of cutting the channel shaped wound article into a plurality of segments having the desired length may be included between the step of winding the channel shaped steel article on the drum and the step of electrolytic Cr plating.

As particularly mentioned above, since the electrolytic Cr plating, which is hitherto impossible to apply, can be applied to the sliding faces 6, 6', which are brought into contact with the inner cylinder wall of the oil ring according to the method of this invention, the wear resistance of the oil ring is greatly increased. Moreover, since the many slits 3, 3', can be formed on both sidewalls of the oil ring, both the fit of the sliding faces to the inner cylinder wall and oil scratching effect are improved to a great extent. In addition, a combination of this oil ring with a coiled expander 11 of a corrugated expander 12 brings about advantageous results, FIGS. 11 and 12.

While this invention has been described with reference to particular embodiments thereof, it will be understood that the numerous modifications may be made by those skilled in the art without actually departing from the scope of this invention.

Therefore, the appended claims are intended to cover all such equivalent variations as coming within the true spirit and scope of the invention.

What is claimed is:

1. A method of producing a one-piece channel shaped piston ring comprising:
    forming in a thin steel sheet tape, a plurality of like configured oil windows arranged along a longitudinal centerline of said steel sheet tape at regular intervals,
    bending the steel sheet tape along two lines parallel to said centerline to form a channel shaped article with a C shaped cross section,
    winding the obtained channel shaped article with the free ends of the sidewalls projecting radially outwardly in spiral form on a drum whose outer diameter is equal to the diameter of the piston ring groove in the piston to receive the same,
    subjecting the outer end surfaces of the wound article sidewalls to an electrolytic Cr plating treatment, and
    cutting a plurality of lateral slits within both sidewalls in line with the oil windows but leaving a connecting part between each oil window and each slit from respective sidewalls.

2. A method of producing a one-piece channel shaped piston ring comprising:
    forming in a thin steel sheet tape a plurality of like configured oil windows arranged alternately offset laterally on each side of the centerline of the steel sheet tape,
    bending the steel sheet tape along two lines parallel to said centerline to form a channel shaped article with a C shaped cross section,
    winding the obtained channel shaped article with the free edges of the sidewalls extending radially outwards spirally on a drum whose outer diameter is equal to the diameter of the piston ring groove in the piston receiving the same,
    subjecting the outer surfaces of the wound article to the electrolytic Cr plating treatment, and
    cutting a plurality of lateral slits with definite depths in both sidewalls with the oil windows in line but leaving a connecting part between each oil window and the end of each slit end in alternate side fashion.

3. A method of producing a one-piece channel shaped piston ring comprising:
    forming in a thin steel sheet tape, a plurality of like configured oil windows arranged along a longitudinal centerline of said steel sheet at regular intervals,
    bending the steel sheet tape along two lines parallel to said centerline to form a channel shaped article of C shaped cross section,
    winding the obtained channel shaped article spirally with the free ends of said sidewalls extending radially outwardly on a drum having an outer diameter equal to the diameter of the piston ring groove in the piston receiving the same,
    subjecting the outer surfaces of the wound article to an electrolytic Cr plating treatment,
    cutting a plurality of lateral slits with definite depth in both sidewalls by means of a multiple head grinder to leave a connecting part between each oil window and each slit end at respective sidewalls, and
    cutting the obtained article into a plurality of segments having the desired length.

* * * * *